(12) United States Patent
Wendt et al.

(10) Patent No.: US 10,671,146 B2
(45) Date of Patent: Jun. 2, 2020

(54) ADAPTIVE POWER PROVIDING DEVICE AND METHOD FOR PROVIDING POWER

(71) Applicant: SIGNIFY HOLDING B.V., Eindhoven (NL)

(72) Inventors: Matthias Wendt, Würselen (DE); Lennart Yseboodt, Retie (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/576,301

(22) PCT Filed: May 24, 2016

(86) PCT No.: PCT/EP2016/061699
§ 371 (c)(1),
(2) Date: Nov. 22, 2017

(87) PCT Pub. No.: WO2016/189002
PCT Pub. Date: Dec. 1, 2016

(65) Prior Publication Data
US 2018/0150127 A1    May 31, 2018

(30) Foreign Application Priority Data

May 26, 2015  (EP) .................................. 15169178

(51) Int. Cl.
*G06F 1/3287* (2019.01)
*H04L 12/10* (2006.01)
*G06F 1/26* (2006.01)
*G06F 1/3206* (2019.01)
*G06F 1/28* (2006.01)
(Continued)

(52) U.S. Cl.
CPC ............ *G06F 1/3287* (2013.01); *G06F 1/266* (2013.01); *G06F 1/3206* (2013.01); *H04L 12/10* (2013.01); *G06F 1/26* (2013.01); *G06F 1/28* (2013.01); *H02J 1/14* (2013.01); *H02J 5/00* (2013.01)

(58) Field of Classification Search
CPC ... G06F 1/26; G06F 1/266; G06F 1/28; G06F 1/3287; G06F 1/3206; H02J 1/14; H02J 5/00; H04L 12/10
USPC .................................................. 713/300, 324
See application file for complete search history.

(56) References Cited

U.S. PATENT DOCUMENTS

| 5,884,086 A | 3/1999 | Amoni et al. |
| 7,240,224 B1 | 7/2007 | Biederman |
| 7,650,519 B1 | 1/2010 | Hobbs et al. |

(Continued)

FOREIGN PATENT DOCUMENTS

| EP | 1571745 A1 | 7/2005 |
| WO | 2013138781 A1 | 9/2013 |

OTHER PUBLICATIONS

Mendelson, G., "White Paper All You Need to Know About Power Over Ethernet (POE) and the IEEE 802.3AF Standard," Jun. 2004 (24 Pages).

*Primary Examiner* — Ji H Bae
(74) *Attorney, Agent, or Firm* — Meenakshy Chakravorty

(57) ABSTRACT

The present invention relates to an adaptive power providing device and a method for adaptively providing power to multiple power receiving devices. A power providing device detects at its plugs or ports power drawn by the power receiving devices and adjusts the related port power budget if the drawn power consistently grows over time, thereby avoiding overpower switch-off.

11 Claims, 5 Drawing Sheets

(51) Int. Cl.
  *H02J 5/00* (2016.01)
  *H02J 1/14* (2006.01)

(56) References Cited

U.S. PATENT DOCUMENTS

| | | | |
|---|---|---|---|
| 2006/0053324 A1* | 3/2006 | Giat | H04L 12/10 |
| | | | 713/300 |
| 2006/0063509 A1* | 3/2006 | Pincu | G06F 1/266 |
| | | | 455/402 |
| 2006/0149978 A1* | 7/2006 | Randall | G06F 1/3203 |
| | | | 713/300 |
| 2007/0083779 A1 | 4/2007 | Misaka et al. | |
| 2007/0135086 A1* | 6/2007 | Stanford | H04L 12/10 |
| | | | 455/402 |
| 2008/0052546 A1 | 2/2008 | Schindler et al. | |
| 2008/0244282 A1* | 10/2008 | Hansalia | G06F 1/266 |
| | | | 713/300 |
| 2009/0193276 A1* | 7/2009 | Shetty | G06F 1/3203 |
| | | | 713/340 |

\* cited by examiner

ADAPTIVE POWER PROVIDING DEVICE AND METHOD FOR PROVIDING POWER

CROSS-REFERENCE TO PRIOR APPLICATIONS

This application is the U.S. National Phase application under 35 U.S.C. § 371 of International Application No. PCT/EP2016/061699, filed on May 24, 2016, which claims the benefit of European Patent Application No. 15169178.9, filed on May 26, 2015. These applications are hereby incorporated by reference herein.

FIELD OF THE INVENTION

The present invention relates to an adaptive power providing device and a method for adaptively providing power to multiple power receiving devices.

BACKGROUND OF THE INVENTION

U.S. Pat. No. 7,650,519 B1 describes a system and methods for connecting a graphic user interface to a powered network. The network-powered graphic user interface system converts encoded computer user interface signals transmitted over a powered network cable to multiple signal sets, each set associated with a peripheral device interface. Methods for managing the admission of the peripheral devices are also described. Connection criteria include the power budget for the connection, device characteristics, device power requirements and the characteristics of other devices sharing the powered network connection.

A commercially implemented system for providing power from a power providing device to multiple power receiving devices is the so-called "Power over Ethernet" (PoE), where the power providing device is called "Power Sourcing Equipment" (PSE) and the power receiving device is called "Powered Device" (PD).

For a PoE standard currently under consideration (IEEE 802.3bt) a scheme called "Autoclass" is discussed, being a classification mechanism that allows a PD to communicate its effective maximum power consumption to the PSE in such a way that the PSE will be able to set a power budget to the effective maximum PD power including the effective channel losses. An aim of this is a more efficient use of the available power as only the effectively used power is budgeted.

A possible process for this may have the steps of an controlled inrush (after a connection is provided by inserting a cable or the like), where the allocated power budget corresponds to the initially maximum possible power, of a maximal power consumption (after the PD started up) of the PD, with the PSE measuring the (maximum) power consumption, and finally of a reallocation of the power budget by the PSE for the PD based on the measure maximum power consumption (e.g. calculated by adding a margin accommodating for fluctuations of power requirements and measurement variations or errors).

Such autoclass approach allows, in comparison to the conventional power classes provided by PoE, for a finer granularity in the allocation of power and therefore for an improved power management.

However, still a problem exists with a number of PoE applications in which the PD power requirement is not stable over the lifetime but may vary. When the maximal power of the PD is growing over time, overload detection will trigger the PSE to switch off power provision to the PD.

Typical examples for PDs where this can happen are robotic systems where, for example, wear in the gear or aging grease increases moving resistance and subsequently the required power for the electrical drive. In lighting applications, a drop in LED efficiency and reduced optical quality of the luminaire may lead to increase input power need.

According to the method currently contained in the draft standard IEEE 802.3bt (in correspondence with earlier standards) a PD which needs more power than classed during its classification cycle will get switched off whenever its power drawn is above the overpower threshold the PSE has memorized. In a retry cycle the PSE will reclass the PD before it gets powered on again. For lamps in lighting applications this would mean that they would be turned off at a certain moment in time. As long as there is sufficient power budget reserve available the lamp can be restarted but an unpleasant flicker will irritate users of the illuminated space.

A straightforward possibility for addressing such increase in the power needs over time, so to avoid the switching off and on, may be to increase the margin appropriately such that even the increased power need still falls into the allocated power budget. Such approach, however, would offset the improved power management intended by the drafted standard IEEE 802.3bt.

SUMMARY OF THE INVENTION

It is an object of the present invention to provide a power providing device for providing power to multiple power receiving devices and a method of providing power by a power providing device to multiple power receiving devices addressing the above mentioned problems and allowing for adaptively providing power while reducing the conventional need for powering down and reclassification.

In a first aspect of the present invention a power providing device arranged for providing power to multiple power receiving devices is presented, wherein the power providing device is a power source equipment and arranged to provide the power by power over Ethernet a power negotiation unit configured to detect a power receiving device and to perform a power negotiation with the power receiving device, a power monitoring unit configured to monitor the power consumption of each power receiving device, and a power control unit configured to at least temporarily suspend power provision to a power receiving device in case the power consumption of said power receiving device exceeds a power budget allotted in the power negotiation to said power receiving device, wherein the power control unit is further configured increase the power budget allotted to said power receiving device in response to the power consumption of said power receiving device exceeding a predetermined consumption threshold value.

In a further aspect of the present invention a method of providing power by a power providing device to multiple power receiving devices, wherein the power providing device is a power source equipment and arranged to provide the power by power over Ethernet, comprising a power negotiation step of detecting a power receiving device and performing a power negotiation between the power providing device and the power receiving device, a power monitoring step by the power providing device of monitoring the power consumption of each power receiving device, and a power suspension step by the power providing device of at least temporarily suspending power provision to a power receiving device in case the power consumption of said power receiving device exceeds a power budget allotted in the power negotiation to said power receiving device, the method further comprising a budget adjustment step by the power providing device of increasing the power budget allotted to said power receiving device in response to the power consumption of said power receiving device exceeding a predetermined consumption threshold value.

It was realized by the inventors that the above mentioned problems may be overcome or at least reduced by giving the power providing device the ability of adjusting the power budget in order to avoid an event of reaching an overpower limit, thereby seamlessly providing a following of the budget to the development of the power receiving device.

In other words, the present invention provides for a "dynamic power class" mechanism in a PSE (as an example of a power providing device) is constantly adjusting the budgeted power with monitored power of the PD (as an example of the power receiving device). In this way, typical reasons for increased maximum power consumption of power receiving devices can be accommodated without intermediate power off cycling.

In a preferred embodiment, the power control unit is configured to increase the power budget only in case a total of power budgets allotted to the multiple power receiving devices is less than a total of power providable by the power providing device to the multiple power receiving devices.

Even though it might be possible to allow for a certain amount of over-budgeting, taking into consideration that not all power receiving devices may demand their complete budget at the same time, the sum of all allotted power budgets should preferably not exceed the total available power.

In a modification of the preferred embodiment, the power control unit is arranged for determining, based on a rate of change of the power consumption of said power receiving device and a difference between the total of power budgets allotted to the multiple power receiving devices and the total of power providable by the power providing device to the multiple power receiving devices, a time during which the power budget may be increased, wherein the power providing device further comprises an output unit for outputting a signal indicative of said determined time.

Based on such determined or estimate time, the user may take steps for replacing, for example, power receiving devices showing an increased power demand at a suitable time before the power limit is reached.

In a preferred embodiment, the power control unit is arranged for reducing a power budget allotted to at least one different power receiving device upon or prior to increasing the power budget allotted to said power receiving device.

The dynamic approach on power budgets allows also for temporarily reducing another allotted power budget, which at a later point in time may be (again) increased.

In a preferred embodiment, the power control unit is configured to increase the power budget only in case a rate of change of the power consumption of said power receiving device is less that a predetermined rate threshold value.

A change in the power consumption beyond a certain rate of change may be indicative of a malfunction, in which situation preferably there is no increase in the allotted power budget provided.

In a preferred embodiment, the power control unit is arranged for determining a difference between an original power budget of a power receiving device and the increased power budget, wherein the power providing device further comprises an output unit for outputting a signal indicative of said difference exceeding a predetermined difference threshold value.

The difference threshold value may be used as a means for indicating a certain amount of deterioration or the like at the power receiving device causing the increased power demand.

In a preferred embodiment, the power control unit is arranged for determining a difference between an original power budget of a power receiving device and the increased power budget, wherein the power control unit is configured to increase the power budget only in case the difference between the original power budget and the increased power budget is less than a predetermined range value, the predetermined range value being set either in absolute terms or based on a ratio of the original power budget.

It is not necessarily the case that the allotted power budget is adjusted or increased as long as the total available power allows for such adjustment and the allowable change over time may be limited.

In a modification of the preferred embodiment in which the increase of the power budget is allowed only in case a total of power budgets allotted to the multiple power receiving devices is less than a total of power providable by the power providing device to the multiple power receiving devices, only in case a rate of change of the power consumption of said power receiving device is less that a predetermined rate threshold value, and/or only in case the difference between the original power budget and the increased power budget is less than a predetermined range value, the predetermined range value being set either in absolute terms or based on ratio of the original power budget, when the power control unit is not allowed to increase the power budget, the power control unit is, in addition to at least temporarily suspending power provision to a power receiving device, further configured to provide a signal indicative of the power control unit being not allowed to increase the power budget.

Preferably before the suspension of the power provision takes place, the power providing device according to this embodiment indicates, e.g. by means of a data signal, by sound and/or by light, that an adjustment of the power budget is not possible and that therefore an exceeding of the allotted power budget may be expected in the future.

In a preferred embodiment, the power control unit is arranged, in response to a request and/or upon meeting a predetermined condition, for setting the power budgets allotted to at least two of the multiple power receiving devices based on a respective current power consumption of said power receiving devices.

A re-setting or re-allotting of a number of power budgets allows for redistributing the totally available power prior to the adjustment of the particular allotted power budget.

In a preferred embodiment, the power providing device further comprises a memory, wherein the power control unit is configured to store information related to increasing the power budget into the memory.

In a further aspect of the present invention a software product for controlling the provision of power from a power providing device to multiple power receiving devices is provided, the software product comprising code means for causing a power providing device according to the invention to carry out the step of the method according to the invention.

It shall be understood that the power providing device arranged for providing power to multiple power receiving devices of claim 1, the method of providing power by a power providing device to multiple power receiving devices of claim 11, and the computer program of claim 12 have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
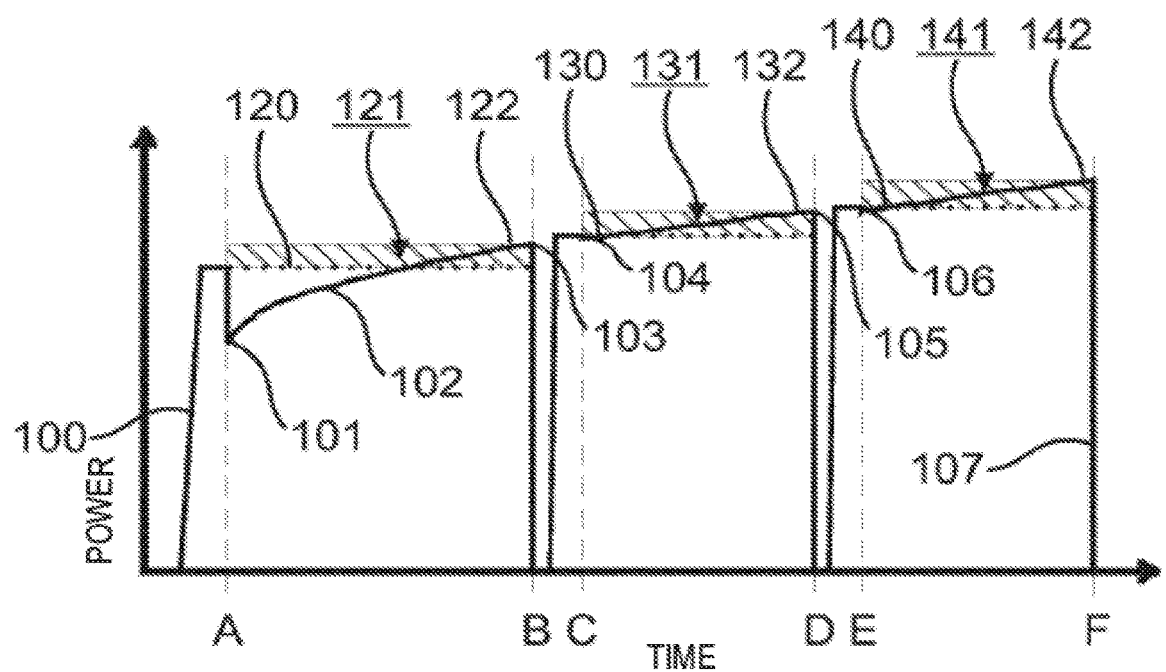
FIG. 1 shows a development over time in accordance with conventional allocation of power budgets, including reclassification with powering down.

FIG. 1 shows a development over time in accordance with conventional allocation of power budgets, including reclassification with powering down, in a case of Power over Ethernet. In FIG. 1 (as well as in FIG. 2) the ordinate indicates power and the abscissa indicates time.

Line 100 shows the power consumption by the PD or the power provided by the PSE:

As discussed above, at the start of the operation of the PD (position A in the time line) the PSE detects the maximal power 120 to be consumed by the PD and adds a margin 121 on top of it leading to the overpower threshold value 122, resulting in the allotted power budget. The PD when switched on 101 is consuming an increasing amount of power 102 over an extended time period (not drawn to scale). When this hits the overpower threshold at 103 (position B in the time line) the PSE deactivates the related port and starts a new negotiation cycle (during this cycle a PD being a lamp would be off and the related space not illuminated). The PD now can use "Autoclass" to signal a higher required amount of power 130. Again the margin 131 is added leading to the new overpower threshold value 132 or allotted power budget. The PD gets powered again 104 (position C in the time line).

When PD power again hits the overpower threshold at position 105 (position D in the time line) the PSE deactivates and so on. This may go on (following position E in the time line) until no budget for more power is available (position 107) (position F in the time line) when after the overpower switch off no new negotiation starts or no negotiation succeeds if alternatively a negotiation is initiated by the PSE but as budget is exhausted it is not leading to repowering the PD.

Figure 2:
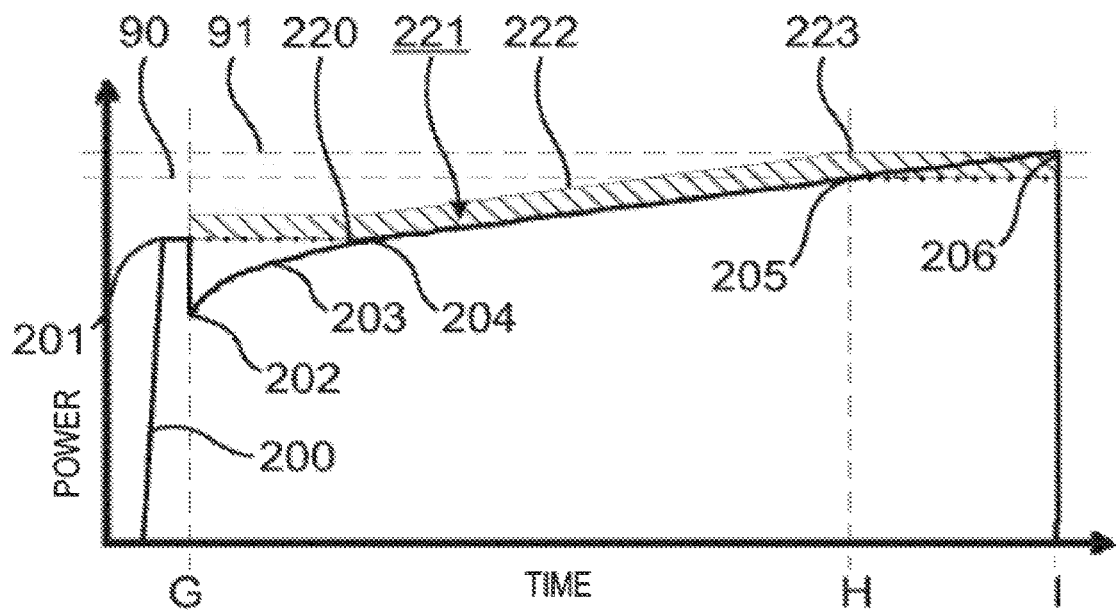
FIG. 2 shows a development over time in accordance with an embodiment of the invention.

FIG. 2 shows a development over time in accordance with an embodiment of the invention.

The start of the development of the power consumption by the PD or the power provision by the PSE (illustrated by line 200) corresponds to the discussion above and the case of FIG. 1, i.e. as in normal "Autoclass" PoE systems. After starting (position G in the time line) a power budget is initialized at a value 222, corresponding to the "autopower" value presented by the PD in the pulse level 201 before with an added margin 221. Here also a power consumption threshold value 220 is set.

In this embodiment, the power initial consumption is set to the previously measure maximal initial power consumption 201, even though a different setting is also possible.

The PD draws an initial power 202 after classification has been finalized. When the PD power demand slowly increases (as shown by 203) and reaches (in average) the originally set consumption threshold value 220 at point 204, the budget and the consumption threshold value (maintaining a constant margin to the budget) grow in line with the power demand.

It is to be noted that, while in this embodiment the consumption threshold value 220 is provided with a constant margin 221 to the allotted power budget 222, this is not necessarily the case in all embodiments of the invention. Alternatively, the consumption threshold value may also be a fixed portion of the allotted power budget (i.e. maintaining the ratio between consumption threshold value and power budget) or may also come closer to the allotted power budget over time.

When at position 205 the maximally available budget 91 of the PSE is reached (position H in the time line) the auto-adjustment ends (keeping the budget at level 223) and hence the consumption threshold value remains at level 90.

Finally, when the consumed power reaches the allotted power budget (point 206 or position I in the time line), further adjustment of the power budget is no longer possible and the overpower management shuts down the power provision.

In the case shown in FIG. 2 detection means that the current monitoring which is also used by the PSE to watch about over currents is used for observing any changes in PD power consumption. So the power is estimated by looking at the current only and estimating that the voltage at the PD is not changing. The power budget is set at a value that keeps sufficient margin for any noise in measurements as well as in PD current ripple.

Nevertheless, it also possible to take into consideration possible changes in the voltage at the PD.

Figure 3:
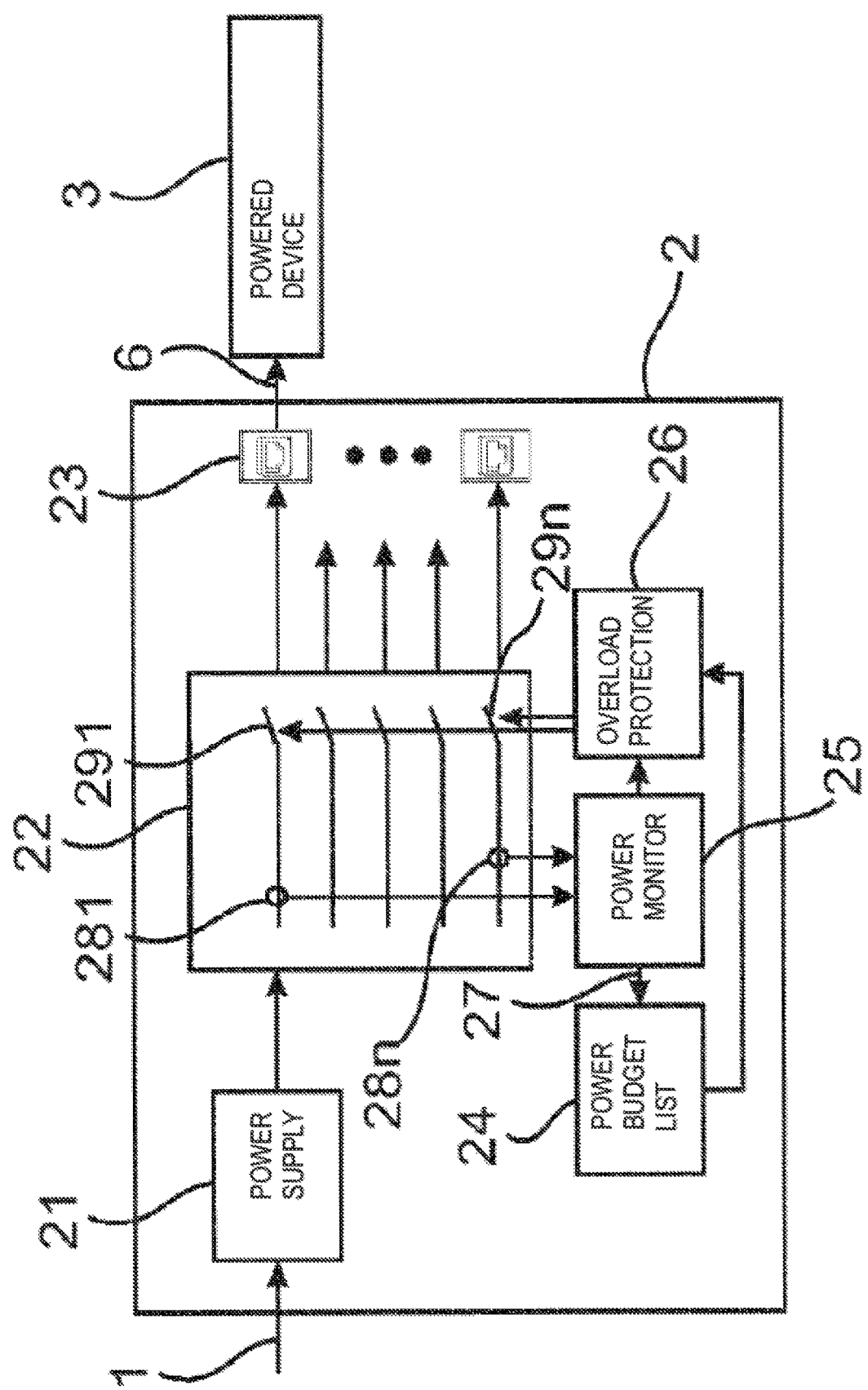
FIG. 3 shows a schematic representation of a Power Sourcing Equipment in accordance with an embodiment of the invention.

FIG. 3 shows a schematic representation of a Power Sourcing Equipment in accordance with an embodiment of the invention.

Specifically, FIG. 3 shows a PoE PSE 2 according to the present invention as an example of a power providing device, including an incoming line 1 for receiving power from mains and a number of connecting lines 6 to PDs 3. In this illustration, a power negotiation unit is not shown.

The PSE includes a mains power supply 21 feeding the PSE ports 23 through port control means 22. This unit 22—as an example of a portion of a power control unit—has per port 23 an isolation switch 291-29$n$ and a current measurement means 281-28$n$. The current measured is used in a PSE-PI power monitor 25 (as an example of a power monitoring unit) to detect—in particular—consistently increasing power usage of a PD and modify a PSE port power budget list 24 (an example of a memory) accordingly. The information in this list is used by a PSE PI overload protection system 26—as an example of a further portion of a power control unit—in order switching of ports 23 (or PDs 3) which take more power than the budgeted power. The information flow 27 from the PSE-PI power monitor 25 to the PSE PI overload list 24 is already present in discussed "Autoclass" PSEs as there the budget gets adjusted to a maximal power presented during the classification time. Hence no new hardware is needed in this context to implement the mechanism of dynamic power class in comparison to "Autoclass PSE".

The mechanism described here is using the margin between an allotted power budget and the originally determined maximum power consumption not only for the original intended use which was noise in current measurement and ripple in the PD current. For the mechanism of dynamic power class described herein the margin is used for adjusting the budget whenever the PD is consistently using more power than budgeted and hence makes consistently use of the margin.

Figure 4:
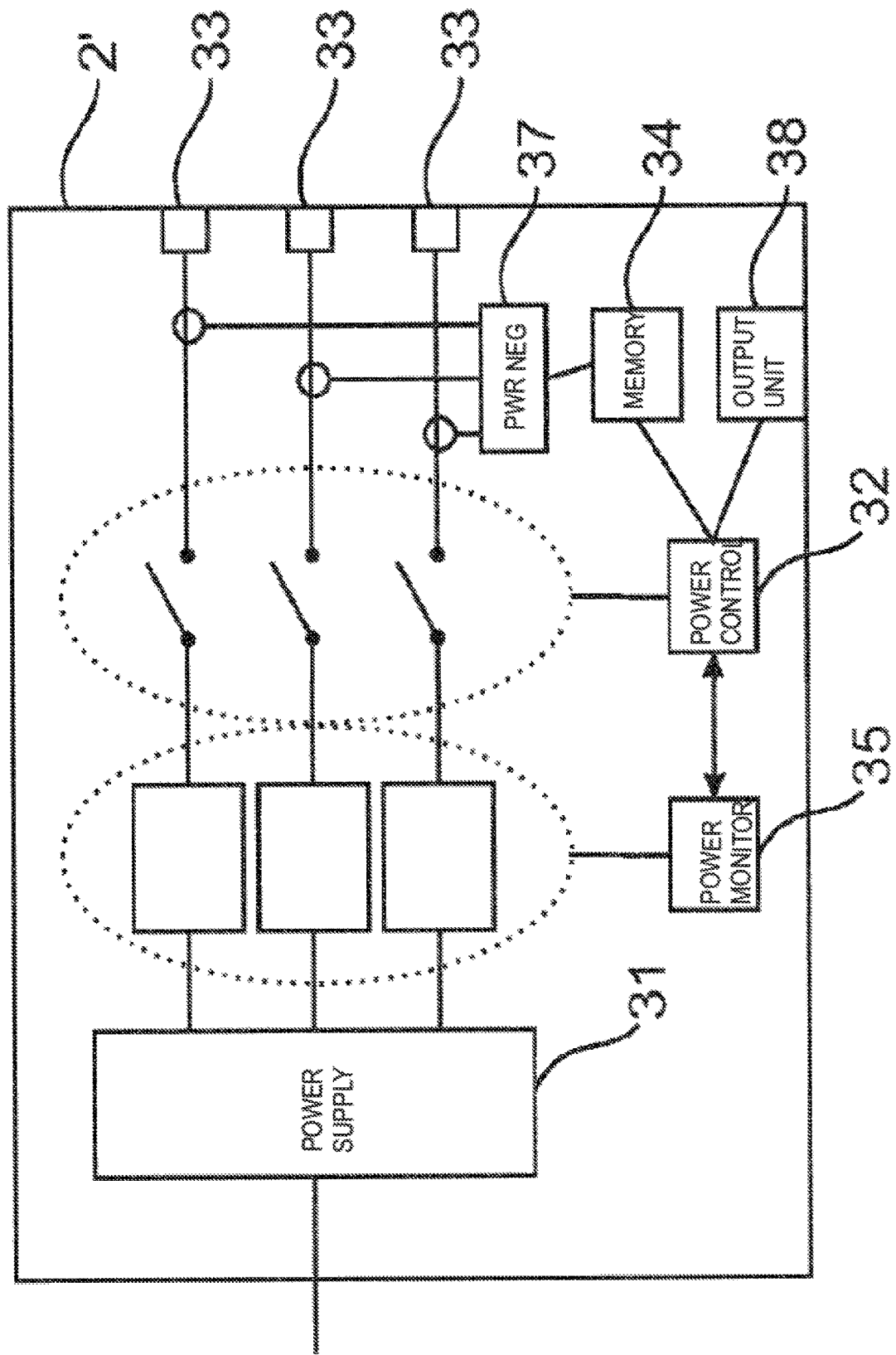
FIG. 4 shows a schematic representation of a Power Sourcing Equipment in accordance with another embodiment of the invention.

FIG. 4 shows a schematic representation of a Power Sourcing Equipment in accordance with another embodiment of the invention.

The power providing device 2' is provided in the form of a power sourcing equipment in accordance with Power over Ethernet. The PSE 2' in connected to a power source (not shown) and receives power at an internal power supply 31. The power supply 31 (the control of which per se is not shown or discussed here) is connected to ports 33 of the PSE, to which powered devices (not shown; examples of power receiving devices) can be connected.

The PSE 2' includes a power monitoring unit 35 which is arranged to monitor the power provided by the power supply 31 to each port 33. In particular, the power monitoring unit 35 includes means for detecting the current drawn by each PD connected to a respective port 33.

Further, in the PSE', there is included a power control unit 32, which is provided with switches for selectively interrupting the connection between the power supply 31 and each port 33. It is to be noted that a control of the power supply to a respective port may also be provided in any other manner in accordance with providing power to power receiving devices. The skilled person is sufficiently familiar with such measure, so no further explanation thereof is needed.

The PSE 2' additionally includes a power negotiation unit 37, coupled to the connection to the ports 33, so to be arranged for performing power negotiation with PDs connected to the ports 33. Again, as the skilled person is familiar with power negotiation as such, additional explanation thereof is not needed.

The power negotiation unit 37 is coupled to a memory 34 and stores therein the results of the power negotiation, such that the respective power budgets and consumption threshold values can be checked by the power control unit 32. The consumption threshold values may be set by the power negotiation unit 37 or they may be set by other means, e.g. by the power control unit 32.

In operation, the power monitoring unit 35 monitors the power consumption of the respective PDs and informs the power control unit 32 accordingly. The power control unit 32 compares the respective power consumption with the consumption threshold value.

If the current power consumption is less than the consumption threshold value, no measures are to be taken.

If the current power consumption of a particular PDs exceed the consumption threshold value, the power control unit 32 checks whether it is possible to increase the allotted power budget, e.g. checks whether the current total available power is more than the currently provided or allotted power.

Additionally, the power control unit 32 checks whether the increase in power consumption should be considered anomalous, e.g. whether the rate of increase is beyond a rate threshold value, which might be indicative of, for example, a short circuit situation.

Furthermore, the power control unit 32 checks whether an adjustment of the allotted power budget may exceed an allowable range based on an originally set or allotted power budget of the PD.

If all checks give a positive result, the power control unit 32 modifies the entry in the memory 34 as to the allotted power budget for the respective PD or port 33.

If it turns out that a modification of the power budget is not possible, the power control unit 32 causes an output unit 38 to indicate such situation to the outside, e.g. to the user of the PSE 2'.

Additionally, the power control unit 32 checks for whether the power consumption of a PDs (or port 33) exceeds the respective allotted power budget. If there is over-consumption, the power control unit 32 provides that the power supply to the port 33 is at least temporarily interrupted or stopped altogether (until a next power negotiation).

Figure 5:
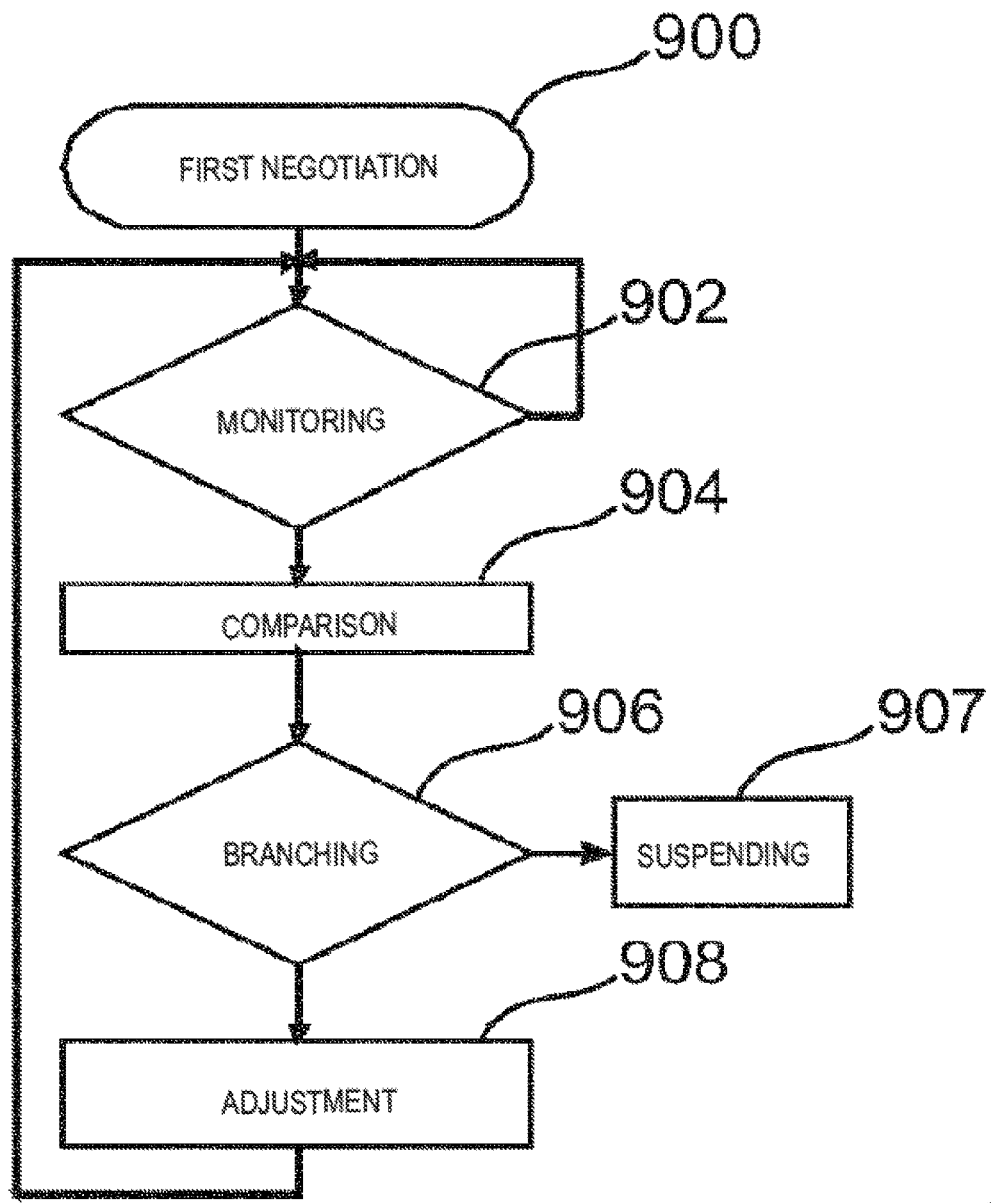
FIG. 5 shows a flow diagram illustrating a process according to an embodiment of the invention.

FIG. 5 shows a flow diagram illustrating a process according to an embodiment of the invention.

In a first negotiation step 900, a PoE power budget management is provided. Following after this, in monitoring step 902, it is checked whether the (for example, average) power consumption at a certain port exceeds a consumption threshold value.

If there is no excess consumption, the flow returns to step 902, forming a loop.

If there is excess consumption, it is checked, in a comparison step 904, whether the currently allotted total power budget allows for increasing the budget allotted to the port or PD showing excess consumption. Depending on the outcome of this check, in branching step 906, the flow either goes to suspending step 907 or to adjustment step 908. In suspending step 907, it is checked whether not only the consumption threshold value is exceeded but also the allotted power budget. If the power budget is also exceeded, the provision of power to the PD is suspended, at least for a certain amount of time. If the allotted power budget is not exceeded, the process may return to step 902.

In the adjustment step 908, the allotted power budget and the consumption threshold value are adjusted and the flow returns to step 902.

The present invention includes a process of deciding whether or not following with the power budged the average draw power. The process as explained above is executed for each port of the PSE. In the monitoring step 902, a consistently taking higher power than a limit close the allotted budget is detected. The average (or peak) power is compared to the available budget reserves. If there is sufficient reserve it gets adjusted to a new value. If no sufficiently reserve is found, the allotted budget is kept. If the power drawn is above budget (including the margin discussed above) the PD gets switched off by the over power process not shown her.

Figure 6:
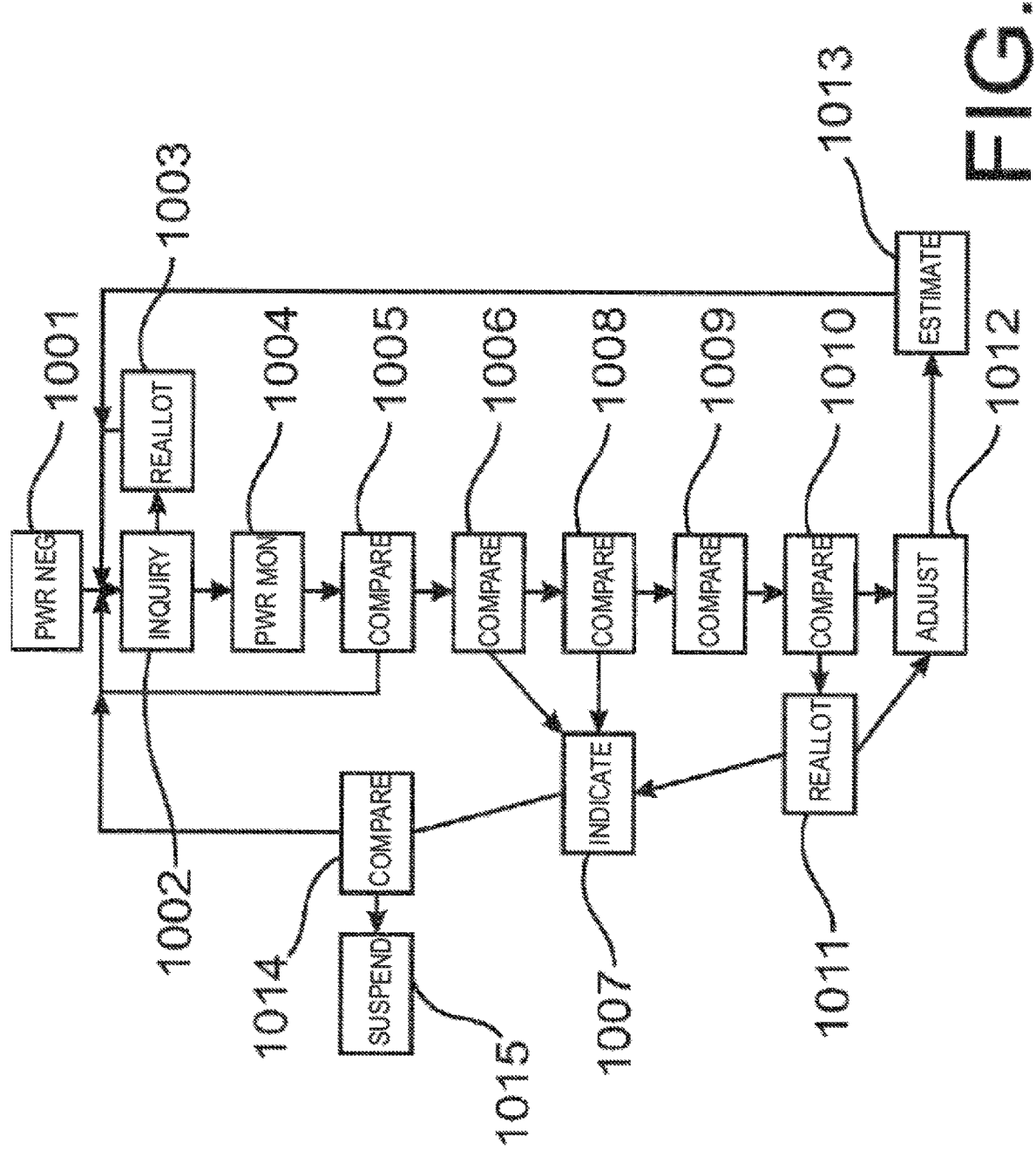
FIG. 6 shows a flow diagram illustrating a process according to another embodiment of the invention.

FIG. 6 shows a flow diagram illustrating a process according to another embodiment of the invention.

The process starts with a power negotiation step 1001 of detecting a PD as a power receiving device and performing a power negotiation between a PSE as a power providing device and the PD.

In an inquiry step 1002, it is checked whether there is a request and whether a predetermined condition is met and depending on the outcome of such check, the power budgets allotted to at least two of the PDs are newly allotted based on a respective current power consumption of said PDs in a first reallottment step 1003, after which the process returns to step 1002.

If neither a request is provided nor the condition is met, the process is taken to monitoring step 1004, where the PSE monitors the power consumption of the coupled PDs.

In a first comparison step 1005, the consumed power is compared with a consumption threshold value. If the consumed power is less than the threshold value, the process returns to step 1002.

In a second comparison step 1006, a rate of change of the power consumption of respective PD is compared with a predetermined rate threshold value. If the threshold is exceeded, indicating a unusual increase in power consumption possibly caused by a malfunction, the process is taken to indication step 1007. Otherwise, the next step is a third comparison step 1008, where, after determining a difference between an original power budget of the PD and a possibly increased power budget (or the currently increased power budget), this difference is compared with a predetermined range value like 5 W. Here the predetermined range value is set in absolute terms, even though other ways of setting or predetermining may also be used, e.g. setting based on a ratio of the original power budget. In case the difference is too large, the next step would be step 1007, otherwise the process continues with a forth comparison step 1009.

In the fourth comparison step 1009 the difference between the original power budget of the PD and the increased or current power budget is checked and a signal indicative of said difference exceeding a predetermined difference threshold value is outputted in case.

In a following fifth comparison step 1010, it is checked whether a total of power budgets allotted to the multiple PDs is less than a total of power providable by the PSE to the multiple PDs (i.e. whether currently an increased allotted power budget is possible at all). In case no adjustment appears possible based on the currently allotted power budgets, in a second reallotment step 1011, is attempted to reduce a power budget allotted to at least one different PD. If successful, the flow continues to an adjustment step 1012, otherwise the flow continues to step 1007.

In indication step 1007, it is indicated to the user of the PSE, that an adjustment of the allotted power budget is not possible. Depending on whether or not the allotted power budget is exceeded (sixth comparison step 1014), either the power supply to the PD is (temporarily) suspended or stopped in a suspending step 1015 (followed by conventional over load processing) or the process returns to step 1002.

In the adjustment step 1012, the allotted power budget and the consumption threshold value are adjusted.

In an estimation step 1013, based on a rate of change of the power consumption of said PD and a difference between the total of power budgets allotted to the multiple PDs and the total of power providable by the PSE to the multiple PDs, a time is determining or estimated, during which the power budget for the particular PD may be increased, whereafter a signal indicative of said determined or estimated time is outputted, after which step the process returns to step 1002.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

For example, it is possible to operate the invention in an embodiment wherein the classification, in the context of Power over Ethernet or the like is not provided following the autoclass approach as discussed for IEEE 802.3bt but according to the conventional power classes. In such context, the allocation of the budget is provided by "jumping" to the next higher class (as long as there is sufficient total power available). In order to be compliant with the standard this method may probably only be used when a PD has identified to be in one of the 802.3bt classes (currently discussed as type 3 and 4 classes).

In a further developed embodiment a communication protocol LLDP (or a similar protocol) may be used, so commands can be issued by the power receiving device(s) in order to reset the (ever growing) budget to the actual power drawn, in this way power budgets can be swapped under the control of (a) power receiving device(s).

In a different embodiment the power providing device may request the power receiving device to step back to a lower power level and after that reduce the actual budget. This allows for a dynamic power budget control by the power providing device.

A further sophisticated system may allow a central (e.g. lighting) controller to monitor the adjustments in order to warn the building management of an aging power receiving device which might need to be serviced or replaced. A power providing device may even be able sending related alert messages whenever substantial grows of input power shows up at any power receiving device.

A particular further embodiment of the invention provides a Power over Ethernet PSE which detects at its PoE plugs (PSE PI) power drawn by the PD and adjusts the related port power budget if the drawn power consistently grows over time, thereby avoiding overpower switch-off. The PSE dynamically may step up the power class to the next higher class. The overpower threshold may be adjusted to higher values keeping always a fixed margin compared to the average power observed. It is possible that the rest budget is used to determine whether further grows is possible. The actual power budget may be reset to a certain value. The value may be written via network commands. The value may be taken from actual (or averaged) power drawn by the related PD. A load (PD) may request to reset the budget to a new value. Other nodes (PDs) connected to the network like a building control system can request to reset the budget to a new value. The PD may be informed to reduce input power before a reset of budget action is initiated. The actual budget may be read through network commands by e.g. the building control system. Changes of the budget may be signaled towards a central node, e.g. the building control system.

In the claims, the word "comprising" does not exclude other elements or steps, and the indefinite article "a" or "an" does not exclude a plurality.

A single processor, device or other unit may fulfill the functions of several items recited in the claims. The mere fact that certain measures are recited in mutually different dependent claims does not indicate that a combination of these measures cannot be used to advantage.

Operations like detecting a power receiving device, performing power negotiation, monitoring power consumption, suspending power provision, increasing a power budget, and further operation, management and diagnostics steps can be implemented as program code means of a computer program and/or as dedicated hardware.

A computer program may be stored and/or distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A power providing device arranged for providing power to multiple power receiving devices, wherein the power providing device is a power source equipment arranged to provide the power by power over Ethernet and comprises a processor arranged to:
   detect a power receiving device and to perform a power negotiation with the power receiving device,
   monitor the power consumption of each power receiving device, and
   at least temporarily suspend power provision to a power receiving device in case the power consumption of said power receiving device exceeds a power budget allotted in the power negotiation to said power receiving device,
   wherein the processor is further configured to increase the power budget allotted to said power receiving device in response to the power consumption of said power receiving device exceeding a predetermined consumption threshold value;
   wherein the processor is configured to increase the power budget only in case a rate of change of the power consumption of said power receiving device is less that a predetermined rate threshold value.

2. The power providing device according to claim 1, wherein the processor is configured to increase the power budget only in case a total of power budgets allotted to the multiple power receiving devices is less than a total of power providable by the power providing device to the multiple power receiving devices.

3. The power providing device according to claim 2, wherein the processor is further arranged for determining, based on a rate of change of the power consumption of said power receiving device and a difference between the total of power budgets allotted to the multiple power receiving devices, and the total of power providable by the power providing device to the multiple power receiving devices, a time during which the power budget may be increased,
   wherein the power providing device further comprises an output unit for outputting a signal indicative of said determined time.

4. The power providing device according to claim 1, wherein the processor is further arranged for reducing a power budget allotted to at least one different power receiving device upon or prior to increasing the power budget allotted to said power receiving device.

5. The power providing device according to claim 1, wherein the processor is further arranged for determining a difference between an original power budget of a power receiving device and the increased power budget, wherein the power providing device further comprises an output unit for outputting a signal indicative of said difference exceeding a predetermined difference threshold value.

6. The power providing device according to claim 1, wherein the processor is further is arranged for determining a difference between an original power budget of a power receiving device and the increased power budget, wherein the power control unit is configured to increase the power budget only in case the difference between the original power budget and the increased power budget is less than a predetermined range value, the predetermined range value being set either in absolute terms or based on a ratio of the original power budget.

7. The power providing device according to claim 2, wherein, when the processor is not allowed to increase the power budget, the processor is, in addition to at least temporarily suspending power provision to a power receiving device, further configured to provide a signal indicative of the processor being not allowed to increase the power budget.

8. The power providing device according to claim 1, wherein the processor is further arranged, in response to a request and/or upon meeting a predetermined condition, for setting the power budgets allotted to at least two of the multiple power receiving devices based on a respective current power consumption, of said power receiving devices.

9. The power providing device according to claim 1, further comprising:
   a memory, wherein the processor is configured to store information related to increasing the power budget into the memory.

10. A method of providing power by a power providing device to multiple power receiving devices, wherein the power providing device is a power source equipment arranged to provide the power by power over Ethernet, the method comprising the steps of:
    detecting a power receiving device and performing a power negotiation between the power providing device and the power receiving device,
    monitoring, by the power monitoring device, the power consumption of each power receiving device,
    at least temporarily suspending, by the power providing device, power provision to a power receiving device in case the power consumption of said power receiving device exceeds a power budget allotted in the power negotiation to said power receiving device, and
    increasing, by the power providing device, the power budget allotted to said power receiving device in response to the power consumption of said power receiving device exceeding a predetermined consumption threshold value, wherein the power budget is increased only in case a rate of change of the power consumption of said power receiving device is less that a predetermined rate threshold value.

11. A software product for controlling the provision of power from a power providing device to multiple power receiving devices, the software product comprising a non-transitory medium storing instructions configured to:
    detect a power receiving device;
    monitor the power consumption of each power receiving device;
    at least temporarily suspend power provision to a power receiving device in case the power consumption of said power receiving device exceeds a power budget allotted in the power negotiation to said power receiving device; and
    increase the power budget allotted to said power receiving device in response to the power consumption of said power receiving device exceeding a predetermined consumption threshold value, wherein the power budget is increased only in case a rate of change of the power consumption of said power receiving device is less that a predetermined rate threshold value.

* * * * *